Patented July 17, 1951

2,561,302

UNITED STATES PATENT OFFICE 2,561,302

SUBSTITUTED PTERIDINES AND METHODS FOR OBTAINING THE SAME

Eugene L. Wittle and George W. Moersch, Detroit, Mich., assignors to Parke, Davis & Company, Detroit, Mich., a corporation of Michigan No Drawing. Application October 6, 1947, Serial No. 778,278

5 Claims. (Cl. 260—251.5)

This invention relates to substituted pteridines and to methods for obtaining the same. More particularly, the invention relates to pteridines having the formula,

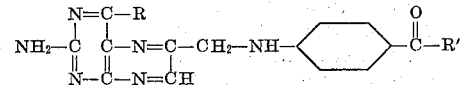

where R is hydrogen and R' is an aliphatic α-amino acid residue bound to the —CO— group in amide linkage from its nitrogen atom.

It will, of course, be appreciated by those skilled in the art that the products of the invention may exist in several tautomeric forms such as, for example, imino as well as amino forms. However, for convenience and simplicity all the tautomeric forms will be represented throughout this specification and the appended claims as in the above formula.

The substituted pteridines of the present invention are yellow to reddish-brown crystalline solids. These compounds possess amphoteric properties and may be produced in the non-salt form having the formula given above or as their acid addition or metal salts. Some examples of the acid addition or anionic salts which are produced by treatment of the substituted pteridines with a strong mineral acid are the hydrochloride, hydrobromide and sulfate salts. The metal or cationic salts can be prepared by several different methods. The alkali metal salts such as the sodium and potassium salts are most conveniently prepared by treatment of the pteridine with an alkali metal hydroxide while double decomposition methods, for example, treating a solution of an alkali metal salt of the compound with a soluble salt of the desired cation, are used to produce the heavy metal salts. Some examples of such heavy metal salts are the zinc, barium, copper, silver and nickel salts.

The products of the present invention are particularly useful in the treatment and study of leukemias and anemias because of their lowering effect upon the white and red blood cell counts. They also possess the property of reversing the vitamin-like action of folic acid and blocking the growth action of micro-organisms such as L. casei, S. fecalis and L. arabinosis. The products wherein the R' residue is derived from a naturally occurring amino acid have been found to possess the greatest degree of therapeutic activity and for this reason are the preferred compounds of the invention.

In accordance with the invention, these new substituted pteridines may be prepared by the simultaneous or stepwise reaction of (1) a 2,4,5-triamino-6-R-substituted pyrimidine, (2) an N-substituted p-aminobenzamide wherein the amide substituent is derived from an aliphatic α-amino acid and (3) a substituted propionaldehyde, an unsaturated derivative thereof or an acetal derivative of such aldehydes. Some examples of the compounds which may be used as this latter reactant are:

α, β-dihalopropionaldehydes, acetals of α, β-dihalopropionaldehydes, α,β,β-trihalopropionaldehydes, acetals of α,β,β-trihalopropionaldehydes, halopyruvic aldehydes, acetals of halopyruvic aldehydes, alkyl esters of 3-oxo-2-halopropionic acids, α-haloacroleins and acetals of α-haloacroleins. The following equations will serve to illustrate some of the various modifications of this process.

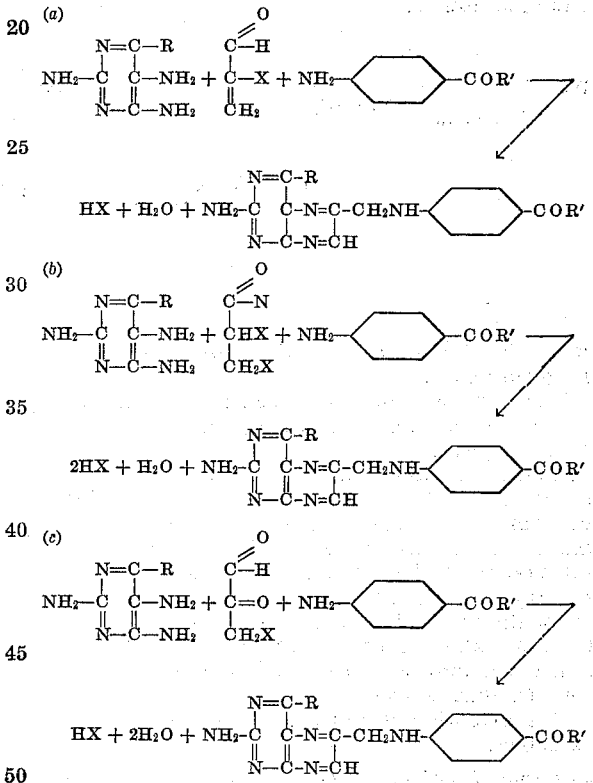

R and R' in the above equations have the same significance as given above and X is a halogen atom.

In carrying out the above described process a wide range of temperature and pH conditions may be en
varied f
for is about 1.9 g. It may be purified, if desired, as described in (a) above to obtain the pure product. The purified compound is chemically and pharmacologically identical with the product obtained in (a) above.

(c) 4 g. of pryidine in 25 cc. of alcohol is added dropwise with stirring over a period of one-half hour to a solution of 10.5 g. of α,β-dibromo propionaldehyde in 350 cc. of 60% alcohol. The mixture is stirred for an additional hour and then 9 g. of 2,4,5-triamino pyrimidine in hydrochloride in 750 cc. of water added. The pH is adjusted to 4 with dilute sodium hydroxide and kept constant while the solution is stirred for four hours. The pH at the end of this time is adjusted to 5 and stirring is continued for ten hours. 10 cc. of 30% hydrogen peroxide is added, the mixture allowed to stand for two hours and then evaporated under reduced pressure to 200 cc. The solution is allowed to stand overnight at about 5° C. and the solid intermediate product collected and dried; yield about 10 g.

A mixture consisting of 10 g. of the intermediate product and 10 g. of p-amino benzoyl l(+)-glutamic acid is added to 200 cc. of anhydrous ethylene glycol containing 700 mg. of dissolved sodium metal and the solution heated under 100 cm. of Hg at 100° C. for one hour. The temperature is raised to 140-50° C. and heating continued for an additional two hours. The solution is cooled, diluted with 500 cc. of water and adjusted to pH 3.5 with dilute hydrochloric acid. The mixture is cooled to about 5° C., allowed to stand overnight and the crude product collected; yield about 4 g. This product may be purified as described in (a) above to obtain the pure N-[4-([(2-amino-6-pteridyl)methyl]amino)-benzoyl]glutamic acid. The pure product obtained in this manner is chemically and pharmacologically identical with those obtained by methods (a) and (b).

*Example 2.—N-[4-([(2-amino-6-pteridyl)methyl]amino)benzoyl]aspartic acid*

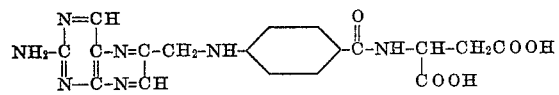

1 g. of α-bromo acrolein dissolved in 50 cc. of 95% ethanol is added dropwise to a stirred solution of 2 g. of p-aminobenzoyl d,l aspartic acid in 200 cc. of water at pH 4 (with sodium hydroxide). After the addition has been completed the mixture is stirred for two hours. 1.2 g. of 2,4,5-triamino pyrimidine hydrochloride in 200 cc. of water is added dropwise to the mixture with stirring and the pH again adjusted to 4-4.5 by the addition of dilute alkali. Stirring is continued at pH 4 for twenty hours, the solution acidified to pH 3 with dilute hydrochloric acid and the crude product collected; yield about 1.5 g.

The crude product can be purified in the manner described in Example 1(a) to obtain the pure N-[4-([(2-amino-6-pteridyl)methyl]amino)-benzoyl]aspartic acid.

*Example 3.—N-[4-([(2-amino-6-pteridyl)-methyl]amino)benzoyl]leucine*

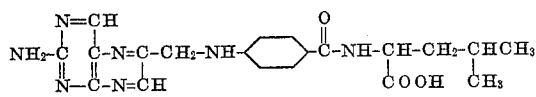

1 g. of α-bromo acrolein dissolved in 50 cc. of ethanol is added dropwise to a stirred solution of 2 g. of p-aminobenzoyl l(−)leucine dissolved in 30% ethanol at pH 4-5 (with sodium hydroxide). After the addition has been completed the mixture is stirred for two hours. 1.2 g. of 2,4,5-triamino pyrimidine hydrochloride in 200 cc. of water is added to the solution with stirring. The pH is readjusted to 4-4.5. After stirring for twenty hours the solution is acidified to pH 2.5 with dilute hydrochloric acid, stirred for an additional two hours and the crude N-[4-([(2-amino-6-pteridyl)methyl]amino)benzoyl]leucine collected; yield about 1.6 g. If desired the crude product may be purified as described in Example 1 (a).

By substituting p-aminobenzoyl l(+)isoleucine for the leucine derivative used above one obtains N-[4-([(2-amino-6-pteridyl)methyl]amino)-benzoyl]isoleucine. Similarly, by using an equivalent quantity of p-aminobenzoyl l(+)valine, N-[4-([(2-amino-6-pteridyl)methyl]amino)-benzoyl]valine is obtained.

*Example 4.—N-[4-([(2-amino-6-pteridyl)methyl]amino)benzoyl]alanine*

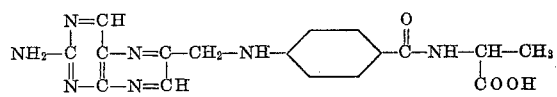

1 g. of α-bromo acrolein dissolved in 50 cc. of 95% ethanol is added dropwise to a stirred solution of 1.66 g. of p-aminobenzoyl l(+)alanine in 200 cc. of water at pH 4. After the addition has been completed the mixture is stirred for two hours and then a solution of 1.2 g. of 2,4,5-triamino pyrimidine in 200 cc. of water is added with stirring. The pH is adjusted to between 4 and 4.5 by the addition of dilute alkali and the mixture stirred for about twenty hours. The reaction mixture is acidified to pH 2.5 with dilute hydrochloric acid, the crude N-[4-([(2-amino-6-pteridyl)methyl]amino)benzoyl]alanine collected and purified as described in the foregoing examples.

By using an equivalent amount p-aminobenzoyl l glycine instead of the l alanine used above, one obtains N-[4-([(2-amino-6-pteridyl)methyl]amino)benzoyl]glycine.

As already pointed out, by following any of the three modifications (a), (b) or (c) of the process above described, with or without pyridinium halide variation shown, and working up the reaction products to isolate the new compounds of the invention in purified form, one obtains new and useful products. However, if desired, one can also directly employ the crude reaction mixtures obtained by modifications (a), (b) and (c) or by any of the specific examples given and use them, instead of the purified products, for the same or similar biological or therapeutic purposes.

What we claim as our invention is:

1. A compound of the formula,

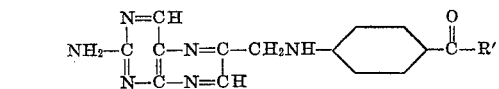

where R' is selected from the group consisting of an aliphatic α-amino acid residue bound to the —CO— group in amide linkage through its nitrogen atom, and salts thereof.

2. A compound of the formula,

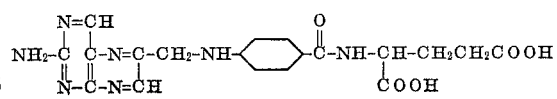

3. A compound of the formula,
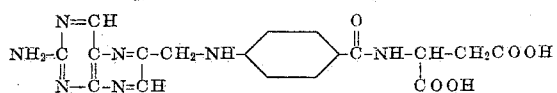
4. A compound of the formula
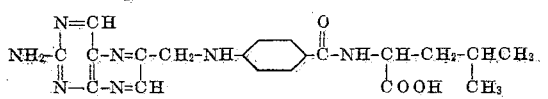
5. A compound of the formula
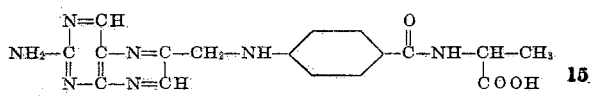
EUGENE L. WITTLE.
GEORGE W. MOERSCH.
REFERENCES CITED
The following references are of record in the file of this patent:
UNITED STATES PATENTS
| Number | Name | Date |
|---|---|---|
| 2,436,073 | Mowat | Feb. 17, 1948 |
OTHER REFERENCES
Beilstein, Vierte Auflage, vol. 25, pp. 423–433 (1936).
Wieland et al.: Ann. 545, 209 (1940).
Angier et al.: Science 103, No. 2,683, pp. 667–669 (1946).